US012767560B2

(12) United States Patent
Pinkard et al.

(10) Patent No.: US 12,767,560 B2
(45) Date of Patent: Oct. 20, 2026

(54) HYDROTHERMAL SYSTEM FOR TREATMENT OF ADSORBENT REGENERATION BYPRODUCTS

(71) Applicant: University of Washington, Seattle, WA (US)

(72) Inventors: Brian Pinkard, Seattle, WA (US); Igor Novosselov, Seattle, WA (US)

(73) Assignee: UNIVERSITY OF WASHINGTON, Seattle, WA (US)

( * ) Notice: Subject to any disclaimer, the term of this patent is extended or adjusted under 35 U.S.C. 154(b) by 552 days.

(21) Appl. No.: 18/261,618

(22) PCT Filed: Jan. 13, 2022

(86) PCT No.: PCT/US2022/012214
§ 371 (c)(1),
(2) Date: Jul. 14, 2023

(87) PCT Pub. No.: WO2022/155271
PCT Pub. Date: Jul. 21, 2022

(65) Prior Publication Data

US 2024/0391797 A1 Nov. 28, 2024

Related U.S. Application Data

(60) Provisional application No. 63/137,879, filed on Jan. 15, 2021.

(51) Int. Cl.
*C02F 1/52* (2023.01)
*C02F 1/02* (2023.01)
(Continued)

(52) U.S. Cl.
CPC ............ *C02F 1/025* (2013.01); *C02F 1/5245* (2013.01); *C02F 1/66* (2013.01);
(Continued)

(58) Field of Classification Search
CPC .......... C02F 1/025; C02F 1/5245; C02F 1/66; C02F 2101/101; C02F 2101/14; C02F 2101/36; C02F 2209/02; C02F 2209/03
See application file for complete search history.

(56) References Cited

U.S. PATENT DOCUMENTS

2006/0006115 A1* 1/2006 Hsien .................... C02F 1/5245 210/726
2017/0297926 A1* 10/2017 Nickelsen ................ B01J 41/05
(Continued)

FOREIGN PATENT DOCUMENTS

CN 102068782 5/2011
CN 109336206 2/2019
(Continued)

OTHER PUBLICATIONS

Merino et al. (Degradation and Removal Methods for Perfluoroalkyl and Polyfluoroalkyl Substances in Water, Environmental Engineering Science, vol. 33, No. 9, 2016) (Year: 2016).*
(Continued)

*Primary Examiner* — Youngsul Jeong
(74) *Attorney, Agent, or Firm* — CHRISTENSEN O'CONNOR JOHNSON KINDNESS PLLC

(57) ABSTRACT

A continuous reactor and method for destroying contaminants, such as perfluoroalkyl and/or polyfluoroalkyl substances in various feedstocks. Liquid byproducts are continuously hydrolyzed in an aqueous alkaline solution to achieve greater than 99.99% destruction of the contaminants. Continuous hydrolysis achieves a greater conversion efficiency as compared to batch reactions and has a wide application of contaminated feedstocks.

14 Claims, 8 Drawing Sheets

(51) Int. Cl.

| | |
|---|---|
| ***C02F 1/66*** | (2023.01) |
| *C02F 101/10* | (2006.01) |
| *C02F 101/14* | (2006.01) |
| *C02F 101/36* | (2006.01) |

(52) U.S. Cl.

CPC .... *C02F 2101/101* (2013.01); *C02F 2101/14* (2013.01); *C02F 2101/36* (2013.01); *C02F 2209/02* (2013.01); *C02F 2209/03* (2013.01)

(56) References Cited

U.S. PATENT DOCUMENTS

| | | | | |
|---|---|---|---|---|
| 2019/0241452 | A1* | 8/2019 | Ball | C02F 1/70 |
| 2019/0276772 | A1 | 9/2019 | Sanders | |
| 2020/0155885 | A1 | 5/2020 | Strathmann | |
| 2020/0247029 | A1 | 8/2020 | Litzenberg | |
| 2020/0262775 | A1 | 8/2020 | Du | |
| 2020/0407241 | A1* | 12/2020 | Dejarme | C02F 1/441 |
| 2022/0402794 | A1* | 12/2022 | Chen | C02F 1/008 |

FOREIGN PATENT DOCUMENTS

| | | | |
|---|---|---|---|
| CN | 110102249 | | 8/2019 |
| JP | 2009162646 | | 7/2009 |
| WO | 2013031848 | A1 | 3/2013 |
| WO | 2020247029 | | 12/2020 |

OTHER PUBLICATIONS

Cui et al. (Destruction of Per-and Polyfluoroalkyl Substances(PFAS) with Advanced Reduction Processes(ARPs): A Critical Review, Environ. Sci. Technol. 2020, 54, 3752-3766) (Year: 2020).*

PFAS—Per- and PolyfluoroalkylSubstances; 12 Treatment Technologies; May 2021; pp. 1-57 <https://pfas-1.itrcweb.org/12-treatment-technologies/>.

Baghirzade, B. S. et al., "Thermal Regeneration of Spent Granular Activated Carbon Presents an Opportunity to Break the Forever PFAS Cycle," Environ. Sci. Technol. 2021, 55, 5608-5619.

Coyle, C. et al., "US Department of Defense—Funded Research on Treatment of Per- and Polyfluoroalkyl Substance—Laden Materials," Environmental Toxicology and Chemistry—vol. 40, No. 1-pp. 44-56, 2021.

Xuesong Zhang et al. , "Advances in energy systems for valorization of aqueous byproducts generated from hydrothermal processing of biomass and systems thinking," Green Chem. , 2019, 21 , 2518.

Hao, Shilai, et al., "Hydrothermal Alkaline Treatment for Destruction of Per- and Polyfluoroalkyl Substances in Aqueous Film-Forming Foam," Environ. Sci. Technol. 2021, 55, 3283-3295.

International Search Report mailed on May 23, 2022, issued in the corresponding PCT Application No. PCT/US22/12214, mailed on Jan. 13, 2022, 6 pages.

Li, F. et al., "Short-chain per- and polyfluoroalkyl substances in aquatic systems: Occurrence, impacts and treatment," Elsevier: Chemical Engineering Journal 380 (2020) 122506.

Lu, D. et al., "Treatment train approaches for the remediation of per- and polyfluoroalkyl substances (PFAS): A critical review," Elsevier: Journal of Hazardous Materials 386 (2020) 121963.

Saleh, N. B. et al., "Removal of poly- and per-fluoroalkyl substances from aqueous systems by nano-enabled water treatment strategies," Environ. Sci.: Water Res. Technol., 2019, 5, 198.

Vu, C. T. and T. Wu, "Recent progress in adsorptive removal of per- and poly-fluoroalkyl substances (PFAS) from water/wastewater," Critical Reviews in Environmental Science and Technology, 2022, vol. 52, No. 1, 90-129.

Wanninayake, D. M. "Comparison of currently available PFAS remediation technologies in water: A review," Elsevier: Journal of Environmental Management 283 (2021) 111977.

Woodard, S. et al., "Synthetic Media: A Promising New Treatment Technology for 1,4-Dioxane," Sep. 16, 2014; pp. 27-40.

Written Opinion of the International Searching Authority mailed on May 23, 2022, issued in the corresponding PCT Application No. PCT/US22/12214, mailed on Jan. 13, 2022, 12 pages.

Wu, B. et al., "Rapid Destruction and Defluorination of Perfluorooctanesulfonate by Alkaline Hydrothermal Reaction," Environ. Sci. Technol. Lett. 2019, 6, 630-636.

Xie, J. et al., "Removal and recovery of phosphate from water by lanthanum hydroxide materials," Elsevier: Chemical Engineering Journal 254 (2014) 163-170.

Zhang Weilan et al. "Effects of hydrothermal treatments on destruction of per- and polyflyoroalkyl substances in sewage sludge," Environmental Pollution, Barking, GB, vol. 285, Apr. 30, 2021.

Supplementary Europen Search Report dated Jun. 11, 2024, for EP22740023. 11 pages.

* cited by examiner

HYDROTHERMAL SYSTEM FOR TREATMENT OF ADSORBENT REGENERATION BYPRODUCTS

CROSS-REFERENCES TO RELATED APPLICATIONS

This application is National Stage of International Application No. PCT/US2022/012214 filed Jan. 13, 2022, which claims the benefit of U.S. Provisional Application No. 63/137,879, filed on Jan. 15, 2021, herein expressly incorporated by reference.

BACKGROUND

Widespread use of perfluoroalkyl substances and/or polyfluoroalkyl substances ("PFAS"). in manufacturing processes, consumer goods, and firefighting foams has directly contributed to contamination of municipal drinking water supplies at concentrations significantly exceeding recommended exposure levels. The use of aqueous film-forming foams (AFFF) for firefighting training has particularly contributed to the water contamination problem. PFAS show high toxicity, even in the low parts per trillion (ppt) range, and the stability of the C—F bond means that many PFAS are perpetually stable in the environment.

Current remediation methods for PFAS-impacted sites primarily include (a) filtration of PFAS from drinking water and (b) remediation of PFAS in contaminated soils. The most commonly used filtration technologies include PFAS adsorption with granulated activated carbon (GAC) or ion exchange resins (IXR). Soil remediation may involve soil washing followed by filtration with GAC or IXR. All filtration and fixation technologies serve to capture, but not destroy, PFAS molecules. End-of-life disposal with complete defluorination (cleaving the C—F bonds) is needed to eliminate the risk of subsequent environmental re-contamination, or future liability.

For highly contaminated sites or water supplies, the use of regenerable adsorbent media (i.e., regenerable IXR) is advantageous for reducing overall project costs. In the IXR or GAC regeneration process, a fluid is used to remove adsorbed contaminants from the surface of solid IXR or GAC particles. This regeneration fluid may contain methanol and NaCl, among other compositions. After regeneration, the contaminant-loaded regeneration fluid may be distilled for recycling of the solvent (e.g. methanol), leaving a "still bottom" in need of disposal. These still bottoms typically contain high quantities of NaCl, total organic carbon (TOC), and environmental contaminants (e.g. PFAS). Destruction of IXR still bottoms or GAC regeneration byproducts is a significant technical challenge.

Other PFAS capture and/or concentration technologies can be used to separate PFAS from soil or water, which also produce a PFAS-rich byproduct. These include reverse osmosis (RO) or nanofiltration (NF) which produce a reject brine, in situ or ex situ foam fractionation (producing a foam fractionate), soil washing (producing soil wash water), thermal desorption (producing a condensate stream), or some combination. The destruction challenge also applies to these remediation byproducts.

Several technologies have been investigated as general PFAS destruction processes, including electrochemical oxidation over boron-doped diamonds, sonochemical destruction, high-temperature incineration, alkaline hydrolysis, plasma treatment, supercritical water oxidation, and others. However, few destructive technologies have robustly demonstrated the ability to consistently and completely break all C—F bonds, and several are known to produce short-chain PFAS as treatment products. One issue with processes conducted at ambient pressures is the off-gassing of low molecular weight (MW) fluorocarbons, which can volatilize and escape the reaction environment. While most of the aforementioned technologies have been demonstrated to destroy perfluorooctanesulfonic acid (PFOS) and perfluorooctanoic acid (PFOA), few have been demonstrated to achieve complete mineralization.

SUMMARY

Alkaline hydrolysis is an effective process for neutralizing or destroying several hazardous wastes, including chemical warfare agents (CWAs), polychlorinated biphenyls (PCBs) and perfluoroalkyl and polyfluoroalkyl substances (PFAS). Alkaline hydrolysis occurs within the subcritical liquid phase of water (typically T=100-374° C., P=0.1-50 MPa) amended with a suitable base, such as NaOH, KOH, LiOH, $NH_4OH$, and/or $CaOH_2$. Alkaline conditions promote decomposition mechanisms for many compounds and contaminants of interest.

This disclosure is related to a continuous hydrothermal alkaline reactor system and method for the treatment of contaminated environmental remediation and industrial wastewater treatment byproducts, including, but not limited to, adsorbent regeneration byproducts; which may include ion exchange resin (IXR) regeneration brine, IXR regeneration still bottoms, granular activated carbon (GAC) regeneration fluid, GAC regeneration still bottoms, RO reject brine, foam fractionate, soil wash water, thermal desorption condensate, wet scrubber wastewater, and others. These feedstocks contain a high concentration of the compound(s) targeted for capture by the adsorbent media, such as perfluoroalkyl and polyfluoroalkyl substances (PFAS), 1'4-Dioxane, other environmental contaminants, or other substances. The continuous hydrothermal alkaline reactor system facilitates the complete and effective breakdown of environmental contaminants which exist in high concentrations in these and other feedstocks.

In one embodiment, a method for destroying perfluoroalkyl and/or polyfluoroalkyl substances includes introducing a liquid byproduct including a perfluoroalkyl and/or polyfluoroalkyl substance to a reactor; hydrolyzing in the reactor under alkaline conditions the perfluoroalkyl and/or polyfluoroalkyl substance in the byproduct; and producing a continuous stream of product from the reactor, wherein the byproduct is selected from:

- a brine containing water, 20% wt. or less of a salt or base, and 1% wt. or less of the perfluoroalkyl and/or polyfluoroalkyl substance, or
- a solution containing 50 to 90 vol % of an alcohol, 10 to 50 vol % of water, 1 to 5 wt % of a salt or a base, and the perfluoroalkyl and/or polyfluoroalkyl substance, or
- a byproduct from ozone foam fractionate processing having 100 μg/L (ppb) to 10 mg/L (ppm) of the perfluoroalkyl and/or polyfluoroalkyl substance, or
- a byproduct from thermal treatment of soil or spent sorbents containing the perfluoroalkyl and/or polyfluoroalkyl substance, or
- a byproduct from wet scrubbers used to capture contaminants in the emission stream of incinerators, rotary kilns or other thermal destructive processes; or
- an aqueous film-forming foam having 0.3 to 6% by weight of the perfluoroalkyl and/or polyfluoroalkyl substance; or reverse osmosis reject brine having from 1 ug/L (ppb) to 10 mg/L (ppm) of the perfluoroalkyl and/or polyfluoroalkyl substance; or nanofiltration reject brine having from 1 ug/L (ppb) to 10 mg/L (ppm) of the perfluoroalkyl and/or polyfluoroalkyl substance.

In one embodiment, a method for destroying a contaminant in a byproduct from an adsorbent media regeneration or reactivation process includes introducing a byproduct from an adsorbent media regeneration or reactivation process to a reactor; and hydrolyzing in the reactor under alkaline conditions a contaminant in the byproduct, wherein the byproduct is a liquid selected from:

a brine containing water, 20% wt. or less of a salt or base, and 1% wt. or less of the contaminant, or a solution containing 50 to 90 vol % of an alcohol, 10 to 50 vol % of water, 1 to 5 wt % of a salt or a base, and the contaminant.

In one embodiment, both methods may include mixing the byproduct with an alkaline amendment before the reactor.

In one embodiment, both methods may use an alkaline amendment from NaOH, KOH, LiOH, $NH_4OH$, $Ca(OH)_2$ or a combination thereof.

In one embodiment, both methods may introduce the byproduct and an aqueous alkaline solution separately through a first inlet and a second inlet to the reactor.

In one embodiment, both methods may be used to destroy a contaminant that is selected from a perfluoroalkyl compound, a polyfluoroalkyl compound, perfluorooctanesulfonate, perfluorooctanoic acid, 1'4-dioxane, a polycholorinated biphenyl, a hydrocarbon, and a volatile organic carbon, or a combination thereof.

In one embodiment, in the second method, an absorbent media in the absorbent media regeneration or reactivation process is granular activated carbon or an ion exchange resin.

In one embodiment, both methods may include cooling an effluent leaving the reactor to produce a liquid effluent.

In one embodiment, both methods may include cooling the effluent with the byproduct before introducing to the reactor.

In one embodiment, both methods may include introducing a neutralizing agent to the liquid effluent to adjust pH of the liquid.

In one embodiment, both methods may include HCl or $H_2SO_4$ as the neutralizing agent.

In one embodiment, both methods may include adding a calcium salt to the liquid effluent to produce precipitates, wherein the precipitates include $CaF_2$ or $CaSO_4$ or both.

In one embodiment, both methods may include controlling temperature and pressure within the reactor to undergo hydrolysis of the contaminant.

In one embodiment, both methods may include measuring one or more parameters of the liquid effluent including a concentration of the contaminant in the liquid effluent, a concentration of destruction byproducts such as F— ion concentration, or the pH of the liquid effluent, or a combination thereof.

In one embodiment, a system for destruction of a contaminant in a byproduct includes a reactor configured for continuous flow through the reactor; at least one pump has an inlet connected to a reservoir containing a byproduct with a contaminant, and an outlet of the at least one pump is connected to an inlet to the reactor; a heater to control internal temperature of the reactor; a pressure regulator to control internal pressure of the reactor; a heat exchanger to cool reactor effluent, wherein the byproduct is a liquid selected from:

a brine containing water, 20% wt. or less of a salt or base, and 1% wt. or less of the contaminant, or a solution containing 50 to 90 vol % of an alcohol, 10 to 50 vol % of water, 1 to 5 wt % of a salt or a base, and the contaminant, or a byproduct from ozone foam fractionate processing having 100 μg/L (ppb) to 10 mg/L (ppm) of the contaminant, or a byproduct from thermal treatment of soil or spent sorbents containing the contaminant, or a byproduct from wet scrubbers used to capture contaminants in the emission stream of incinerators, rotary kilns or other thermal destructive processes; or an aqueous film-forming foam having 0.3 to 6% by weight of the contaminant; or reverse osmosis reject brine having from 1 ug/L (ppb) to 10 mg/L (ppm) of the contaminant; or nanofiltration reject brine having from 1 ug/L (ppb) to 10 mg/L (ppm) of the contaminant.

In one embodiment, the heat exchanger is a recuperative heat exchanger that cools the reactor effluent with the byproduct.

In one embodiment, the byproduct further includes an alkaline amendment mixed in before the reactor.

In one embodiment, the pressure regulator is placed after an outlet from the reactor.

In one embodiment, the system further comprises a separator placed after the pressure regulator to separate liquid in the reactor effluent.

In one embodiment, the system further comprises an acid reservoir containing neutralizing acid, wherein the acid reservoir is configured to introduce the neutralizing acid to the separated liquid.

In one embodiment, the system further comprises a reagent reservoir containing a reagent, wherein the reagent reservoir is configured to introduce the reagent to the separated liquid to cause precipitation of reaction products.

In one embodiment, the system further comprises a second pump having an inlet connected to a reservoir containing an alkaline solution, wherein an outlet of the second pump is connected to the inlet of the reactor.

In one embodiment, the byproduct is a liquid selected from a wet scrubber used to capture contaminants in the emission stream of incinerators, rotary kilns or other thermal destructive processes.

In one embodiment, a method for destruction of a contaminant in a byproduct includes introducing a byproduct with a contaminant into a reactor configured for continuous flow through an interior of the reactor; maintaining a temperature from 200° C. to 400° C. throughout a length of the interior of the reactor; maintaining a pressure above 22 MPa in the interior of the reactor; introducing a byproduct containing a contaminant to the reactor; introducing an alkaline solution to the reactor to achieve an overall loading from 0.01 M to 20 M $OH^-$; allowing the byproduct to undergo hydrolysis in the reactor; and producing a continuous stream of product from the reactor.

In one embodiment, the overall loading is from 5 M to 20 M $OH^-$.

In one embodiment, the contaminant is selected from a perfluoroalkyl compound, a polyfluoroalkyl compound, perfluorooctanesulfonate, perfluorooctanoic acid, 1'4-dioxane, a polycholorinated biphenyl, a hydrocarbon, and a volatile organic carbon, or a combination thereof.

In one embodiment, a concentration of the contaminant in the product is less than or equal to 0.01% of a concentration of the contaminant in the byproduct.

In one embodiment, the byproduct is a liquid from an adsorbent media regeneration or reactivation process, wherein the liquid byproduct is, a brine containing water, 20% wt. or less of a salt or base, and 1% wt. or less of the contaminant, or a solution containing 50 to 90 vol % of an alcohol, 10 to 50 vol % of water, 1 to 5 wt % of a salt or a base, and the contaminant.

In one embodiment, the byproduct is selected from:

a byproduct from ozone foam fractionate processing having 100 μg/L (ppb) to 10 mg/L (ppm) of the perfluoroalkyl and/or polyfluoroalkyl substance, or a byproduct from thermal treatment of soil or spent sorbents containing the perfluoroalkyl and/or polyfluoroalkyl substance, or a byproduct from wet scrubbers used to capture contaminants in the emission stream of incinerators, rotary kilns or other thermal destructive processes; or an aqueous film-forming foam having 0.3 to 6% by weight of the perfluoroalkyl and/or polyfluoroalkyl substance; or reverse osmosis reject brine having from 1 ug/L (ppb) to 10 mg/L (ppm) of the perfluoroalkyl and/or polyfluoroalkyl substance; or nanofiltration reject brine having from 1 ug/L (ppb) to 10 mg/L (ppm) of the perfluoroalkyl and/or polyfluoroalkyl substance.

In one embodiment, an interior of the reactor is a metal alloy having at least 50% Ni by weight or a stainless steel.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Of the above destruction technologies, this disclosure determines that alkaline hydrolysis when carried out continuously is particularly advantageous for processing adsorbent regeneration byproducts as (i) methanol is stable and thus could be recovered post-processing, (ii) salts remain fully soluble and do not cause issues with precipitation and scale buildup, and (iii) the alkaline hydrolysis process can destroy PFAS and other contaminants with greater than 99.99% destruction efficiencies and without the production of unwanted byproducts. A hydrolysis reaction is a decomposition reaction in which the contaminant to be destroyed (e.g. PFAS) reacts with at least water. Hereafter, "PFAS" is intended to refer to one or more perfluoroalkyl substance and/or one or more polyfluoroalkyl substance.

The herein described system includes a continuous hydrothermal alkaline reactor designed to process liquid byproducts under alkaline conditions. The byproducts contain perfluoroalkyl and/or polyfluoroalkyl substances generated by processes, such as adsorbent regeneration processes, ozone foam fractionate processes, thermal treatments of soil or spent sorbents, aqueous film-forming foams, reverse osmosis reject brine, nanofiltration reject brine, wet scrubbers associated thermal destructive processes, and the like. In one embodiment, the continuous hydrothermal alkaline reactor is operated at temperature and pressure conditions in the range of 200 to 400° C. and 0.1 to 50 MPa, where the primary working fluid and reaction medium is water.

Figure 1:
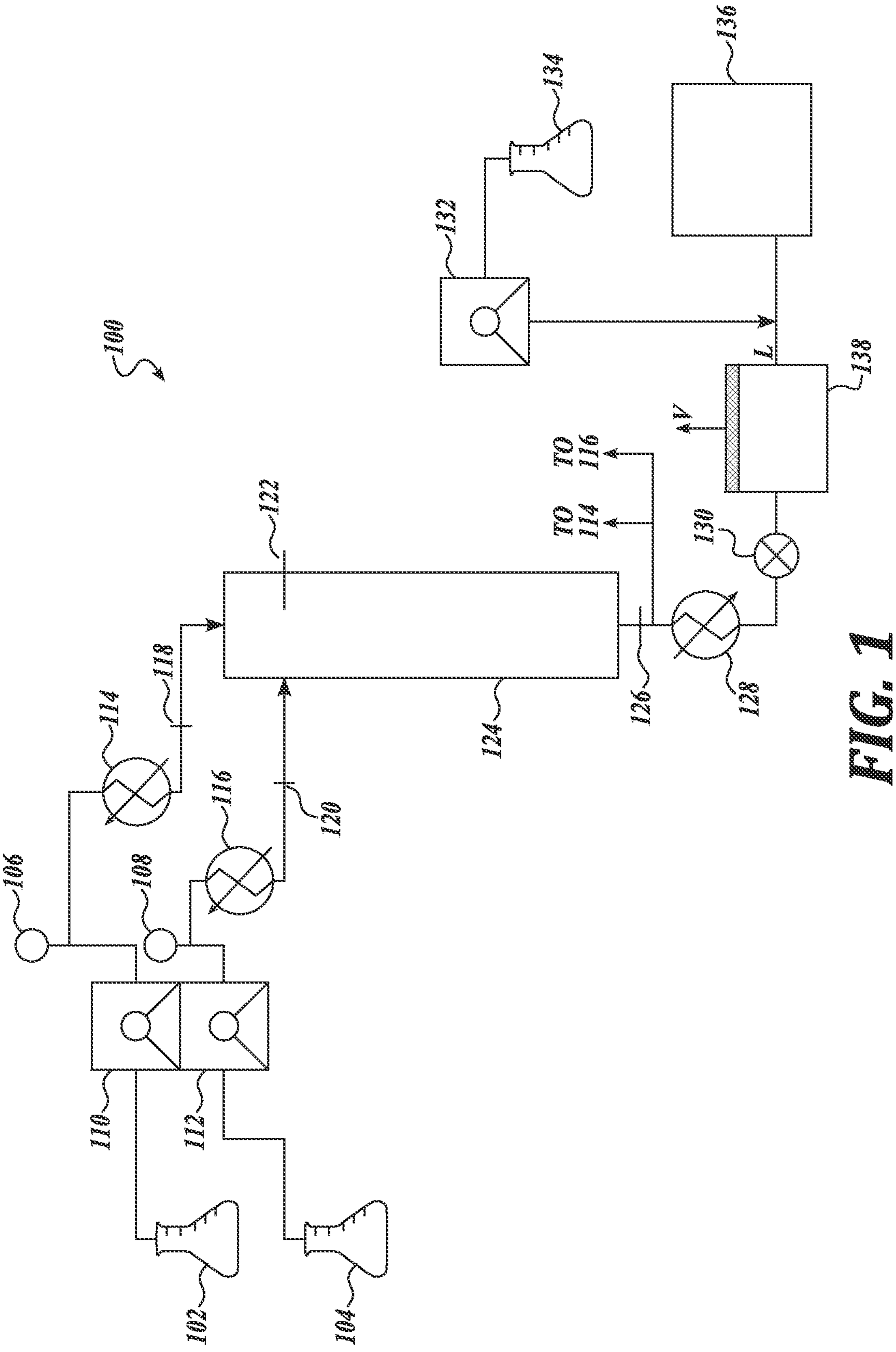
FIG. 1 is a process flow diagram for a representative continuous hydrothermal alkaline reactor system.

FIG. 1 is one example of a continuous hydrothermal alkaline reactor system. In a continuous reactor system, once the proper reaction conditions, including temperature, pressure, and reactant flows are established, a continuous reactor system will produce a continuous stream of product as long as the proper reaction conditions and reactant flows are maintained within the reactor.

An example of a continuous reactor system 100 is illustrated in FIG. 1. In one embodiment, the continuous reactor system 100 includes a reservoir 102 for the influent liquid byproduct and a reservoir 104 for an influent alkaline amendment. The alkaline amendment may include sodium hydroxide (NaOH), potassium hydroxide (KOH), calcium hydroxide ($Ca(OH)_2$), lithium hydroxide (LiOH), ammonium hydroxide ($NH_4OH$) or a combination. The influent liquid byproduct is pressurized by a high pressure pump 110. The influent alkaline amendment is pressurized by a high pressure pump 112. In one embodiment, the pumps 110, 112 may have a prefilter to prevent solid particulates from entering the reactor zone.

In one embodiment, the two pumps may be used in parallel, where the first pump 110 pumps the influent liquid byproduct and a second pump 112 pumps the alkaline amendment solution. In one embodiment, the two pump outlet flows are mixed downstream to create an overall desired alkaline concentration. In one embodiment, the influent liquid byproduct line and the influent alkaline amendment line each have a separate inlet into the reactor 124.

In one embodiment, after the high pressure pumps 110, 112, both the influent liquid byproduct line and the influent alkaline amendment line can include pressure meters 106, 108. In one embodiment, both the influent liquid byproduct line and the influent alkaline amendment line can pass through respective heaters 114, 116. In one example, the effluent product line from the reactor can be used to preheat both the influent byproduct and the influent alkaline amendment in preheaters 114, 116. In one embodiment, after the preheaters 114, 116, both the influent liquid byproduct line and the influent alkaline amendment line can include temperature sensors 118, 120, such a thermocouples.

In one embodiment, the influent liquid byproduct line and the influent alkaline amendment line are premixed to a desired alkaline concentration before entering the reactor 124, and both liquid byproduct and alkaline amendment are introduced as a mixture through a single inlet in the reactor 124. Premixing the liquid byproduct and the alkaline amendment allows the use of a single pump and reduces the instrumentation and one preheater. The premixing can take place in a reservoir upstream of the pump.

In one embodiment, the reactor 124 includes a cylindrical hollow vessel that is closed on both ends with the exception for any inlets for the influent lines and outlet for the effluent product line. The reactor 124 is used for containing the compound destruction reactions at the desired temperature and pressure, and for the desired reaction residence time. In one embodiment, the reactor 124 is preferably insulated to prevent heat loss to the environment.

The reactor 124 vessel is adequately designed to withstand the chemical compositions, temperatures, and pressures described in this disclosure. In one embodiment, the reactor 124 vessel can include instrumentation 122 to measure internal temperature and pressure at any point along the length of the vessel 124 or before or after the vessel 124. In one embodiment, the reactor 124 vessel is devoid of interior baffles or other interior flow modifying structures. In one embodiment, the reactor 124 vessel includes one or more heaters (not shown) for bringing the reacting mixture to the desired operating temperatures. In one embodiment, the heater(s) may be electrical heaters (e.g. band heaters, wrap heaters, cartridge heaters, radiant heaters, immersion heaters, strip heaters, furnace). In one embodiment, the heater(s) may be a burner. In one embodiment, the heater(s) may be a fluidized sand bath or similar.

In one embodiment, the reactor 124 vessel, particularly the interior of the reactor vessel is made of a predominantly nickel-containing alloy (i.e., equal to or greater than 50% Ni by weight), such as alloys designated as Inconel®, Hastelloy®, and the like. In one embodiment, the reactor 124 vessel, particularly, the interior of the reactor vessel is made of stainless steel alloys.

In one embodiment, the reactor outlet line includes a temperature sensor 126, such as a thermocouple.

In one embodiment, the reactor outlet line includes a heat exchanger 128 for cooling the reacting mixture. In one embodiment, the heat exchanger 128 is preferably a recuperative heat exchanger to heat the influent flows flowing into the reactor 124, while cooling the fluid flowing out of the reactor 124. In one embodiment, the heat exchanger 128 and reactor 124 may be one single, combined vessel.

In one embodiment, the reactor outlet line is directed to the preheaters 114 and 116 to preheat the influent liquid byproduct and the alkaline amendment prior to their introduction to the reactor 124. In one embodiment, the heat exchanger 128 may be optional when the preheaters 114, 116 remove sufficient heat from the product rendering the heat exchanger 128 unnecessary.

In one embodiment, the reactor outlet line includes a back-pressure regulator 130. The back-pressure regulator 130 can be a throttling valve, capillary tube, or similar device that is used for reducing the pressure of the outgoing flow to ambient pressures while maintaining the internal pressure of the reacting environment within the reactor 124 vessel.

In one embodiment, a vapor-liquid separator 138 is used after the depressurization device 130. The vapor can be discharged through a separate outlet from the liquid. The vapor can be collected and disposed of through filtration or incineration, for example. The liquid effluent leaving the separator 138 may be further treated prior to disposal.

In one embodiment, the continuous hydrothermal alkaline reactor system 100 includes an acid reservoir 114 containing an acid, such as hydrochloric acid (HCl) or sulfuric acid ($H_2SO_4$). The pump 132 is used to introduce a neutralizing acid (e.g. HCl) to the liquid effluent in the reactor outlet line in order to buffer the pH to near-neutral (between pH=4 and 10) after reaction, cooling, and depressurization.

In one embodiment, after the introduction of the acid, the reactor product line is connected to a liquid collection vessel 136. The liquid collection vessel 136 is used for containing the liquid effluent prior to discharge.

In one embodiment, additional reagents may be added to the collected liquid before, within, or after the liquid collection vessel 136 to precipitate reaction products. For example, the use of $CaCl_2$, $Ca(OH)_2$ or similar can be used to form and precipitate $CaF_2$ (or similar insoluble fluorides) for collection and disposal.

In one embodiment, the continuous hydrothermal alkaline reactor system may also provide for pressure relief, such as a rupture disc, pressure relief valve, or similar device that is used to prevent over-pressurization of the reactor vessel 124.

In one embodiment, temperature-sensing devices, such as thermocouple(s) 118, 120, 122, and 126 are positioned before and after the reactor 124 and along the length of the reactor to measure the reacting flow temperature at one or several locations.

In one embodiment, pressure gauges, pressure sensors, or similar devices are used to measure the internal pressure at one or several locations.

In one embodiment, a control and data acquisition system (not shown) is used to monitor and control the operating parameters based on one or more of the instrumentation, including temperature and pressure sensors.

In one embodiment, the collected liquid may be monitored for pH and/or ion concentrations via an immersion probe.

In one embodiment, the collected liquid may be periodically sampled and analyzed for concentrations of the original contaminant in the influent.

In one embodiment, the continuous hydrothermal alkaline reactor system 100 may be mounted on or in a trailer, a pallet, or within a shipping container to allow the system 100 to be transported and deployed at a site.

In one embodiment, the continuous hydrothermal alkaline reactor system 100 may be contained within a safety enclosure to ensure operator safety. The safety enclosure may be ventilated to prevent off-gassing of harmful chemicals in the event of a reactor leak. The ventilation system may include an air filtration system (e.g. carbon, electrostatic precipitator) to prevent release of harmful gases to the environment in the event of a reactor leak.

Figure 2:
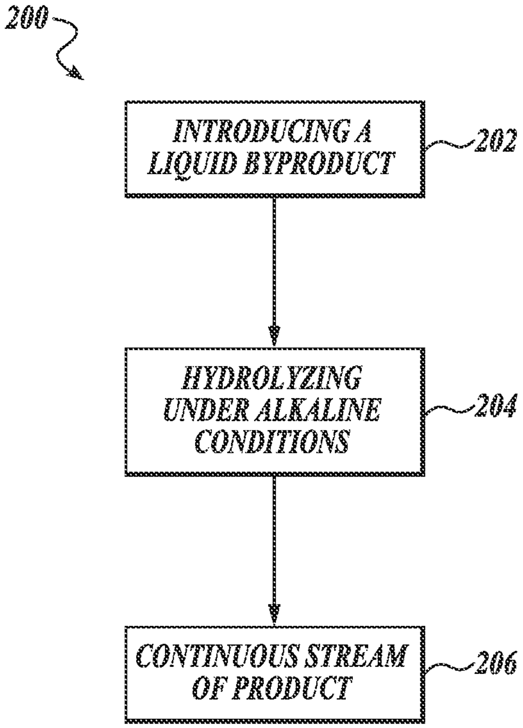
FIG. 2 is a step flow diagram of one embodiment of a method.

FIG. 2 is one embodiment of a method 200 for destroying perfluoroalkyl and/or polyfluoroalkyl substances using a continuous hydrothermal alkaline hydrolysis process.

Features of the method of FIG. 2 include the various liquid byproducts used as feedstock (block 202) and the use of a continuous hydrothermal reactor which produces a continuous flow of product (block 206).

In block 202, liquid byproducts containing one or more perfluoroalkyl and/or polyfluoroalkyl substances are selected from one or more of the following feedstocks.

In one embodiment, any liquid contaminated with PFAS having a total level about or above 100 ppb is a suitable feedstock for the method in FIG. 2.

In one embodiment, the liquid byproduct in the method of FIG. 2 is a brine containing water, 20% wt. or less of a salt or base, and 1% wt. or less of the perfluoroalkyl and/or polyfluoroalkyl substance.

In one embodiment, the liquid byproduct in the method of FIG. 2 is a solution containing 50 to 90 vol % of an alcohol, 10 to 50 vol % of water, 1 to 5 wt % of a salt or a base, and the perfluoroalkyl and/or polyfluoroalkyl substance.

In one embodiment, the liquid byproduct in the method of FIG. 2 is a byproduct from ozone foam fractionate processing having 100 μg/L (ppb) to 10 mg/L (ppm) of the perfluoroalkyl and/or polyfluoroalkyl substance.

In one embodiment, the liquid byproduct in the method of FIG. 2 is a byproduct from thermal treatment of soil or spent sorbents containing the perfluoroalkyl and/or polyfluoroalkyl substance.

In one embodiment, the liquid byproduct in the method of FIG. 2 is a byproduct from a wet scrubber used to capture contaminants in the emission stream of incinerators, rotary kilns or other thermal destructive processes.

In one embodiment, the liquid byproduct in the method of FIG. 2 is an aqueous film-forming foam having 0.3 to 6% by weight of the perfluoroalkyl and/or polyfluoroalkyl substance. In one embodiment, the aqueous film-forming foam is a PFAS-based firefighting foam. The liquid byproduct can be diluted from 10 times to 100 times prior to processing.

In one embodiment, the liquid byproduct in the method of FIG. 2 is reverse osmosis reject brine having from 1 ug/L (ppb) to 10 mg/L (ppm) of the perfluoroalkyl and/or polyfluoroalkyl substance. In one embodiment, the PFAS concentration is between 100 ppb and 10 ppm.

In one embodiment, the liquid byproduct in the method of FIG. 2 is nanofiltration reject brine having from 1 ug/L (ppb) to 10 mg/L (ppm) of the perfluoroalkyl and/or polyfluoroalkyl substance. In one embodiment, the PFAS concentration is between 100 ppb and 10 ppm.

In one embodiment, the liquid byproduct in the method of FIG. 2 is the byproduct from ozone foam fractionate processing that separates PFAS from contaminated liquid. The liquid byproduct in this embodiment can contains PFAS at levels between 100 ug/L (parts per billion) and 10 mg/L (parts per million). In one embodiment, the liquid byproduct can contains very low levels of salts, such as NaCl.

In one embodiment, the liquid byproduct in the method of FIG. 2 is a thermal treatment condensate. In one embodiment, the byproduct from thermal treatment of soil or spend sorbents contains PFAS. The PFAS are vaporized from the solid substrate at temperatures between 200 and 400° C., creating a PFAS-containing vapor which is subsequently condensed and collected for destruction.

Embodiments of liquid byproducts include contaminants. Contaminants can include one or more of the following, perfluoroalkyl substances and polyfluoroalkyl substances (PFAS), perfluorooctanesulfonate (PFOS), perfluorooctanoic acid (PFOA), 1'4-Dioxane, polychlorinated biphenyls (PCBs), hexafluoropropylene oxide dimer acid (HFPO-DA), hydrocarbons, volatile organic carbons (VOCs), and combinations thereof.

In one embodiment, the liquid byproduct used as reactor feedstock in the method of FIG. 2 is produced during the regeneration or reactivation of adsorbent media. Absorbent media can include ion exchange resins or granular activated carbon. Liquid byproducts resulting from regeneration or reactivation of adsorbent media may include the following feedstocks.

In one embodiment, the liquid byproduct is a brine containing water, 20% wt. or less of a salt or base, and 1% wt. or less of the contaminant.

In one embodiment, the liquid byproduct is a solution containing 50 to 90 vol % of an alcohol, 10 to 50 vol % of water, 1 to 5 wt % of a salt or a base, and the contaminant.

In one embodiment, the liquid byproduct is a brine containing about 1 to 20 wt % salt or base (e.g. NaCl) and about 0.01 to 1 wt % of the adsorbed contaminant (still bottoms).

In one embodiment, the liquid byproduct is a solution containing an alcohol, a salt or base, and the adsorbed contaminant (regeneration fluid).

Embodiments of liquid byproducts can include one or more alcohols. In one embodiment, the alcohol is methanol. Embodiments of liquid byproducts can include one or more salts and bases. In one embodiment, the salt or the base is sodium chloride (NaCl).

Embodiments of adsorbed contaminants present on the adsorbent media, such as ion exchange resins or granular activated carbon, may include perfluoroalkyl substances and polyfluoroalkyl substances (PFAS), perfluorooctanesulfonate (PFOS), perfluorooctanoic acid (PFOA), 1'4-Dioxane, a polychlorinated biphenyls (PCBs), hexafluoropropylene oxide dimer acid (HFPO-DA), hydrocarbons, volatile organic carbons (VOCs), and combinations thereof.

Referring to FIG. 2, in block 204, one or more of the byproducts containing one or more of the contaminants is reacted with water and an alkaline amendment in a continuous reactor to hydrolyze the contaminant or contaminants. In one embodiment, the primary working fluid and reaction medium is water. The conditions in block 204 are described in association with FIG. 3.

Figure 3:
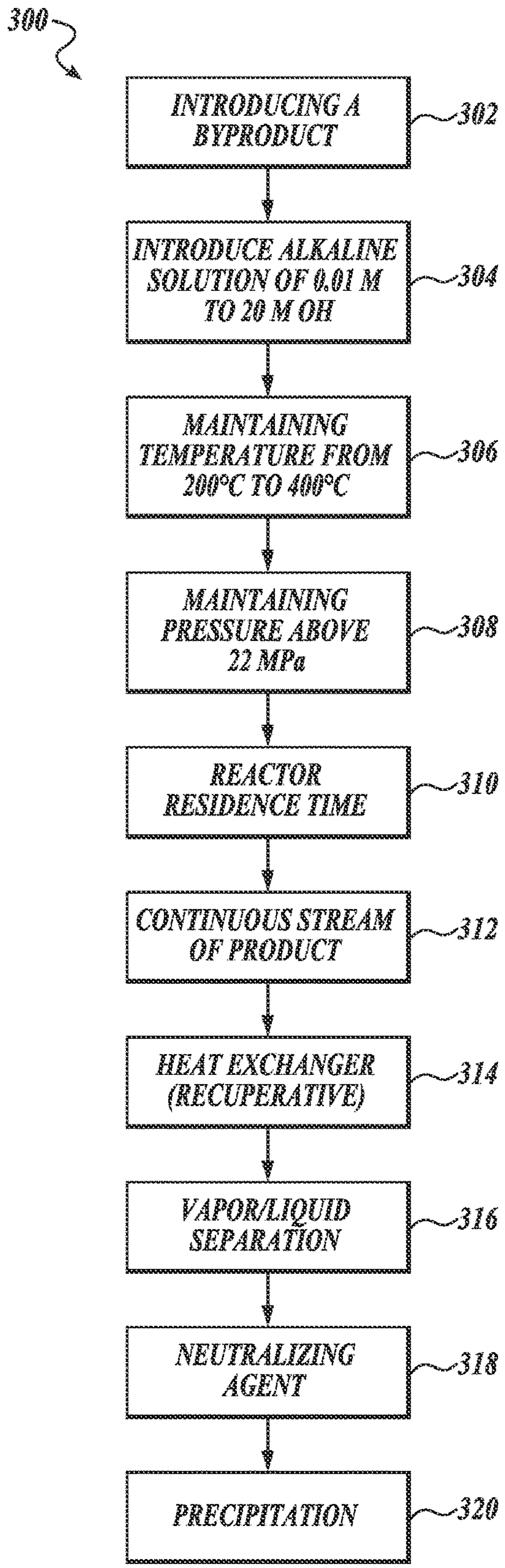
FIG. 3 is a step flow diagram of one embodiment of a method.

FIG. 3 describes a method 300 which can use the same feedstocks in block 302 described in association with block 202 of FIG. 2. Similarly, the method of FIG. 3 uses a continuous reactor which produces a continuous stream of product in block 312.

In FIG. 3, block 304, the alkaline amendment introduced into the reactor is NaOH, KOH, or a combination. However, LiOH, $NH_4OH$, and/or $CaOH_2$ can also be used. NaOH and KOH are the preferred alkaline amendments due to low cost and high solubility. In one embodiment, the alkaline amendment is introduced at any $OH^-$ loading to raise the pH.

In one embodiment, the $OH^-$ overall loading is from 0.01 to 5 M. "M" refers to molarity in moles per liter (mol/L). Overall loading means the concentration in the reactor (i.e., after mixing with the feedstock and/or other influent streams). In one embodiment, the $OH^-$ overall loading is from 5 M to 10 M or even higher. In one embodiment, the OH overall loading is from 5 M to 20 M. In one embodiment, the amount of alkaline amendment is sufficient to have an overall loading of OH greater than 5 M. The level of 5 M OH can drive rapid reactions. In one embodiment, an overall loading greater than 0.01 M OH is used to destroy perfluorocarboxylic acids. In one embodiment, an overall loading greater than 1 M OH is used to destroy perfluorosulfonic acids.

In FIG. 3, block 306, the continuous reactor is operated at a temperature in the range of 200° C. to 400° C. In one embodiment, the reactor temperature is preferably above 300° C. In one embodiment, the reactor temperature is preferably between 350° C. to 374° C. In one embodiment, the reactor is preferably held at a near-constant temperature along the length of the reactor.

In one embodiment, a heater may be used to adjust the internal reactor temperature. Heaters include, but are not limited to, electrical heaters (for example, band heaters, wrap heaters, cartridge heaters, radiant heaters, immersion heaters, strip heaters, and furnaces), burners, fluidized sand bath, and the like.

In FIG. 3, block 308, the continuous reactor is operated at a pressure in the range of 0.1 MPa to 50 MPa. However, the pressure can be any pressure sufficient to maintain a liquid reaction environment. In one embodiment, the pressure is maintained above 22.1 MPa to ensure no transition to a vapor at the ideal temperature range.

In on embodiment, the internal pressure within the pressure 124 vessel is regulated by a back-pressure regulator, such as a throttling valve, capillary tube, or similar device that is used for reducing the pressure of the outgoing flow to ambient pressures while maintaining the internal pressure of the reacting environment within the reactor vessel In FIG. 3, block 310, the residence time of the continuous hydrothermal reactor can be dependent on both the operating temperature and pressure. However, in one embodiment, the continuous reactor has a residence time in the range of 1 minute to 120 minutes. Residence time is used to mean the period of time in which the volume of the reactor is exchanged and can be expressed by: RT=V/Q, where V is the volume of the reactor and Q is the volumetric flow rate of the reactants through the reactor at the elevated temperatures and pressures of the reactor.

Referring to block 206 of FIG. 2 and block 306 of FIG. 3, blocks 206 and 306 indicate a continuous flow of product effluent is output from the reactor. This is to contrast with the intermittent and non-continuous output of batch reactors, for example.

In one embodiment, one or more parameters of the liquid effluent in the reactor product is analyzed. Parameters that may be measured include the concentration of the contaminant in the liquid effluent to determine the destruction efficiency of the contaminant for disposal, the concentration of destruction byproducts such as $F^-$ ion concentration, and the pH of the liquid effluent, or a combination thereof.

In one embodiment, the destruction of the contaminant using the continuous hydrothermal alkaline reactor produces a concentration of the contaminant in the liquid effluent product that is less than or equal to 0.01% of a concentration of the contaminant in the influent feedstock byproduct In one embodiment, the PFAS levels in a continuous reactor effluent is at or below 70 ng/L total PFAS. For example, from a starting concentration of 100 ug/L to 10 mg/L this translates to an overall reduction in PFAS concentration of greater than 99.99% to greater than 99.9999%. In one embodiment, there is an associated production of fluoride corresponding to the initial PFAS concentration in the feedstock (e.g., 99.99% to 99.9999% defluorination efficiency). In one embodiment, the reactor output can be adjusted to neutral pH between 4 and 10, through the use of the acid for pH adjustment.

In block 314, a heat exchanger can be used to cool the product effluent from the reactor. In one embodiment, the heat exchanger is a recuperative heat exchanger that preheats the influent streams, such as the influent liquid byproduct feedstock, the solution of the alkaline amendment, or both. When the liquid byproduct and the alkaline amendment are not pre-mixed prior to the reactor, there can be two heat exchangers to heat each of the influent streams.

In block 316, the product effluent may be introduced into a vapor-liquid separator. In the vapor-liquid separator, the product effluent after the heat exchanger is provided with the space for allowing the separation of any non-condensable vapors or volatile gases. The non-condensable vapors or volatile gases will be vented usually from the top of the separator, and the liquid effluent will be collected in the bottom portion, which may then be further processed.

In block 318, the liquid effluent is neutralized by adding a neutralizing agent. In one embodiment, the neutralizing agent is an acid, such as aqueous hydrochloric acid (HCl). In one embodiment, the pH of the liquid effluent after neutralizing is in the range of 4 to 10.

In block 320, precipitation may be used to extract fluoride or sulfates from the liquid effluent. For example, the use of the reagent $CaCl_2$, $Ca(OH)_2$ or similar can be used to form and precipitate $CaF_2$ or $CaSO_4$ or both for collection and disposal.

Example 1

Ion Exchange Resin (IXR)

Materials and Methods

Experimental Apparatus and Procedures. A continuous, tubular reactor can be used to evaluate the effect of system configuration and flow profiles on PFAS destruction rates. A process flow diagram (PFD) of the continuous hydrothermal alkaline reactor system is shown in FIG. 1. A positive displacement pump introduces a premixed feedstock of IXR still bottoms with 5 M-NaOH into a coiled, tubular reactor section with an internal heated volume of 55.3 mL. Radiant heaters maintain isothermal conditions of 350° C., as measured by two Type-K thermocouples in contact with the flow at intermediate locations. The residence time is calculated neglecting laminar flow profile effects, and assuming the reacting flow density is equal to the density of water at 350° C. Rapid quenching is accomplished with a heat exchanger, before liquid products are collected in HDPE sample containers.

Reagents. Ion exchange resin still bottoms are provided from an industrial partner, with approximate characteristics of ~10 wt % NaCl, and ~1000 ppm total PFAS. NaOH (>97 wt %, Fisher Scientific) is used for reagent preparation. HCl (36.5-38.0 wt %, Millipore Sigma) is used for pH buffering post-treatment.

Data Collection and Analysis. Samples are collected in HDPE sample containers after treatment. HCl is added to samples to buffer the pH to between 5 and 7, as confirmed by pH strips. The dilution effect of HCl addition is factored into correcting the measured effluent characteristics. The solution is then filtered to remove any solid precipitates. Untreated and treated IXR still bottoms are analyzed for 26 PFAS analytes via commercial LC-MS/MS. Samples are also measured for fluoride ion concentration using a handheld fluoride ion-selective electrode (ISE).

Experimental Conditions. The continuous reactor can be operated at a constant internal temperature of 350° C., and residence times of 15, 30, 60, 90, and 120 min. Internal pressure is held at 22 MPa. The overall loading of NaOH is maintained at 5 M.

Example 2

Firefighter Training Pit (FTP)

Figure 4:
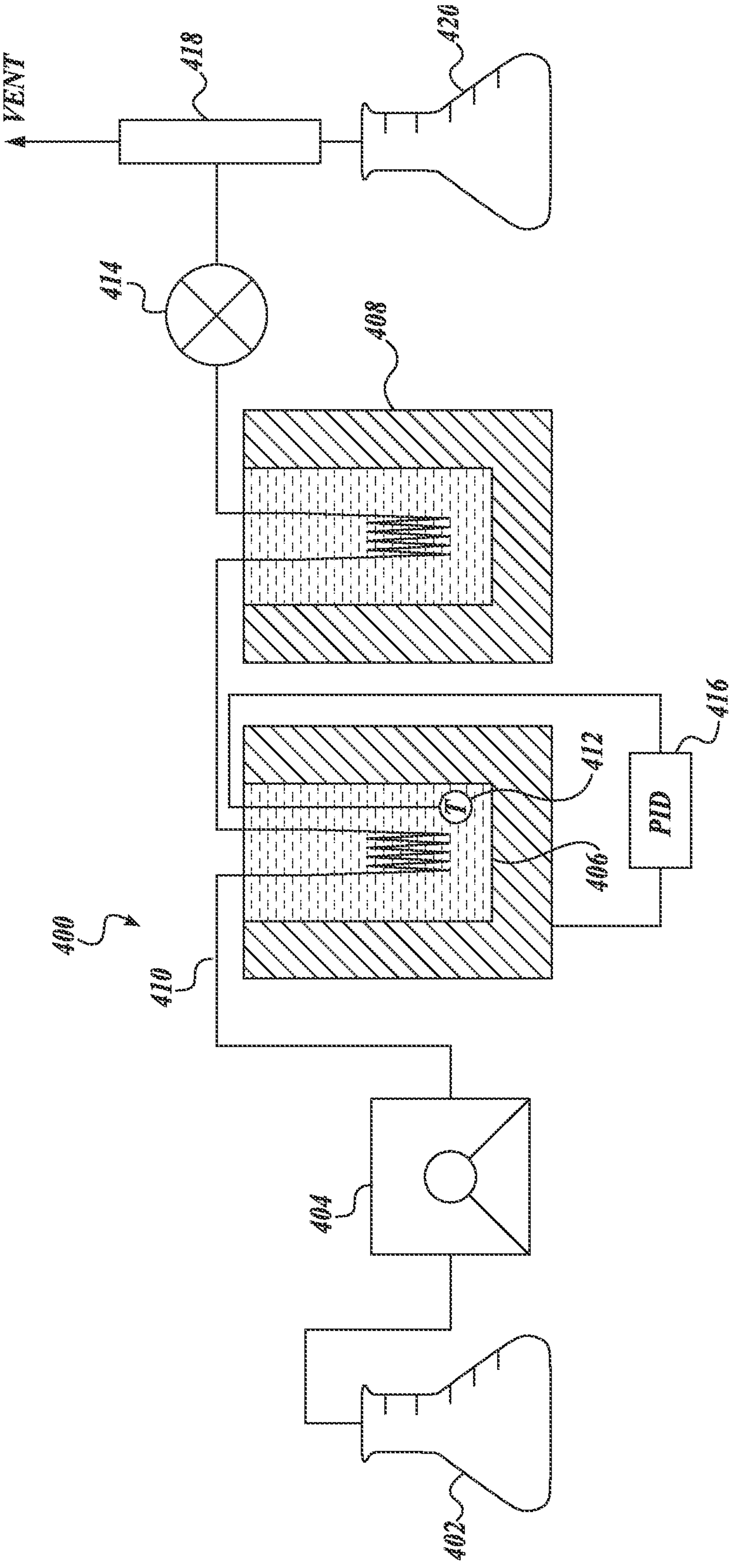
FIG. 4 is a process flow diagram for a representative continuous hydrothermal alkaline reactor system used in Example 2.
Figure 5:
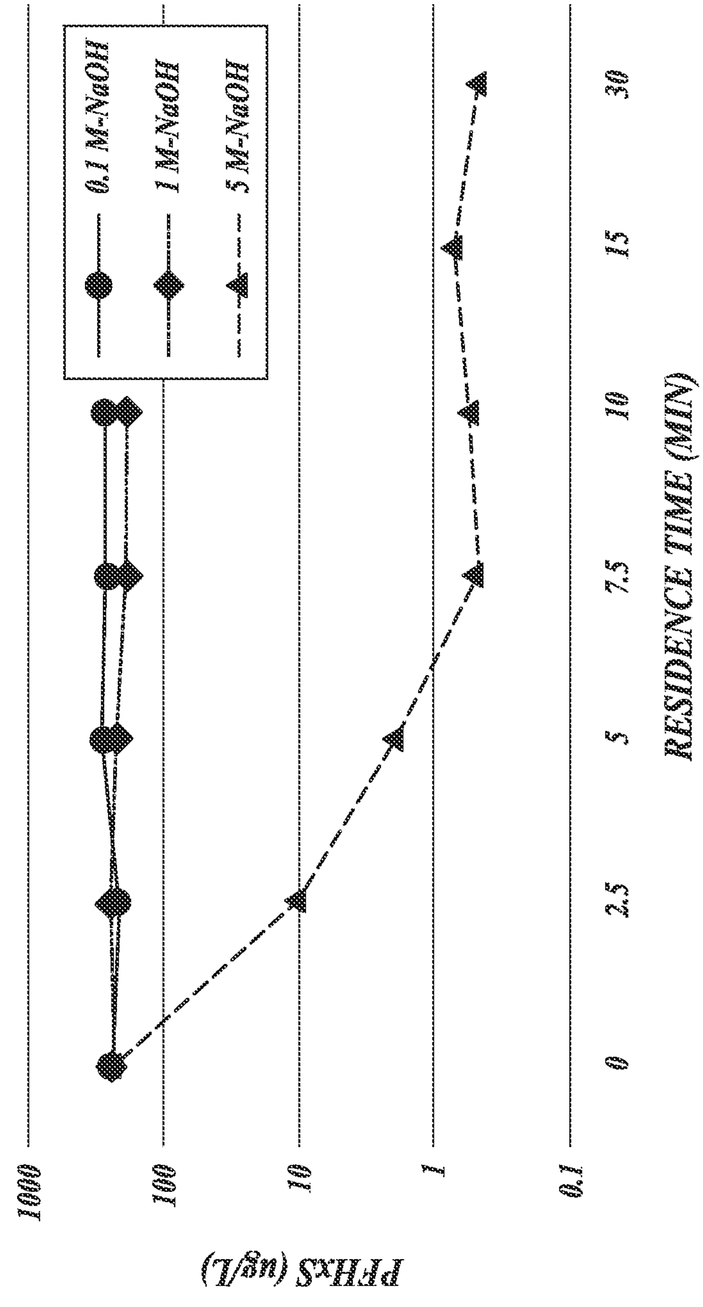
FIG. 5 is a graph of total PFAS destruction for Example 2 residence times and NaOH loadings at 350° C. and 25 MPa in a continuous reactor operated with NaOH loadings of 0.1 to 5 M (mol/L)
Figure 6:
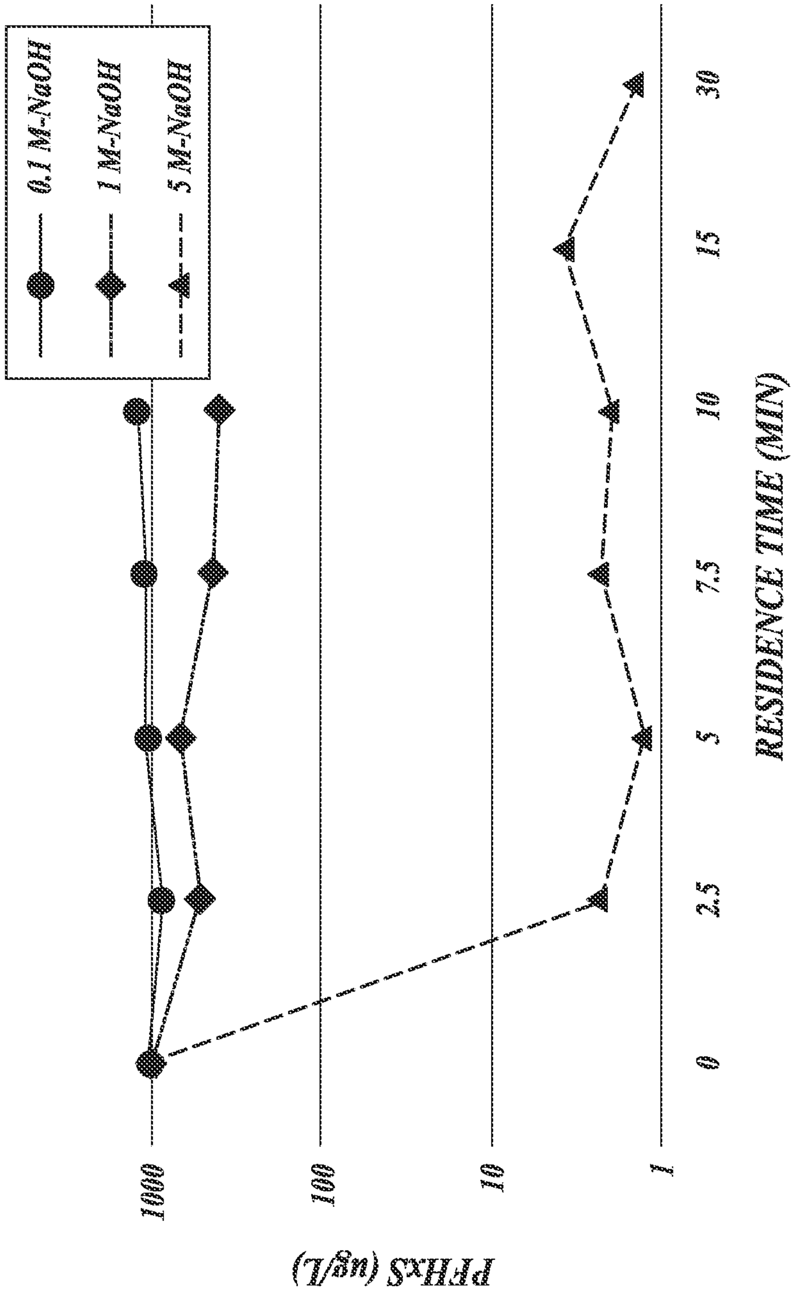
FIG. 6 is a graph of total PFOS destruction for Example 2 residence times and NaOH loadings at 350° C. and 25 MPa in a continuous reactor operated with NaOH loadings of 0.1 to 5 M (mol/L)
Figure 7:
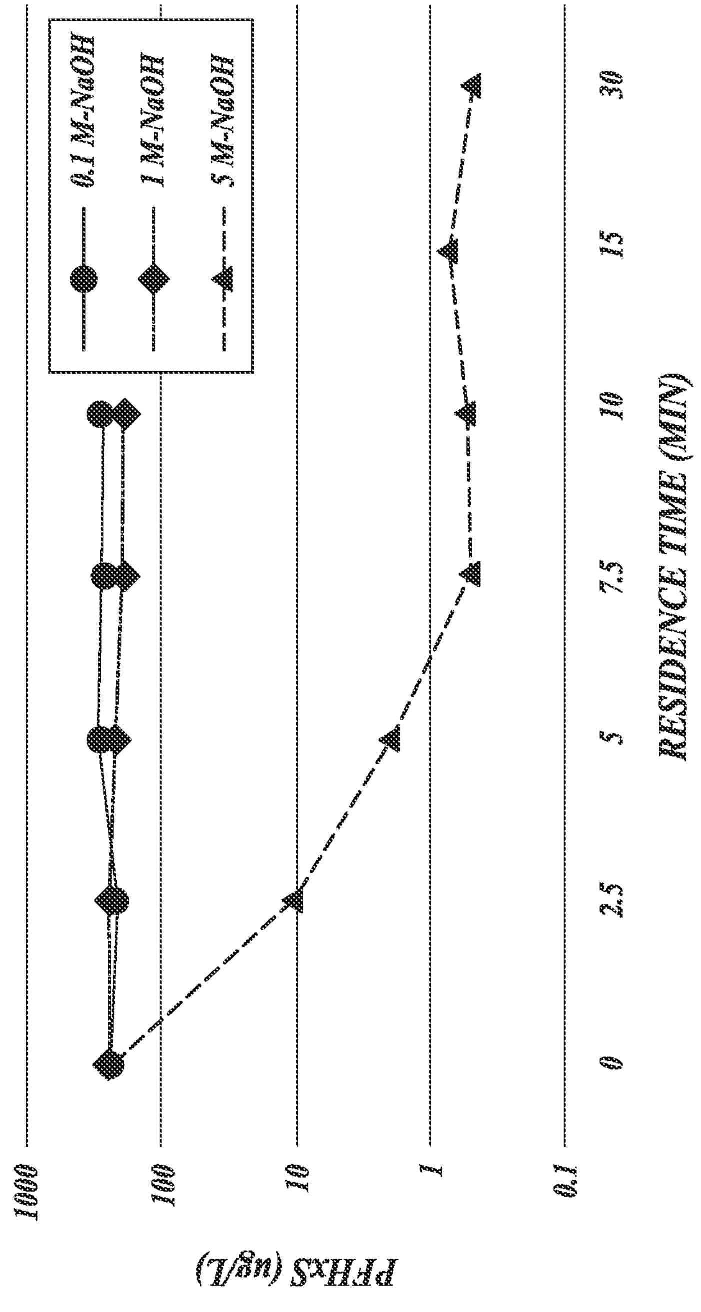
FIG. 7 is a graph of PFHxS destruction for Example 2 residence times and NaOH loadings at 350° C. and 25 MPa in a continuous reactor operated with NaOH loadings of 0.1 to 5 M (mol/L)
Figure 8:
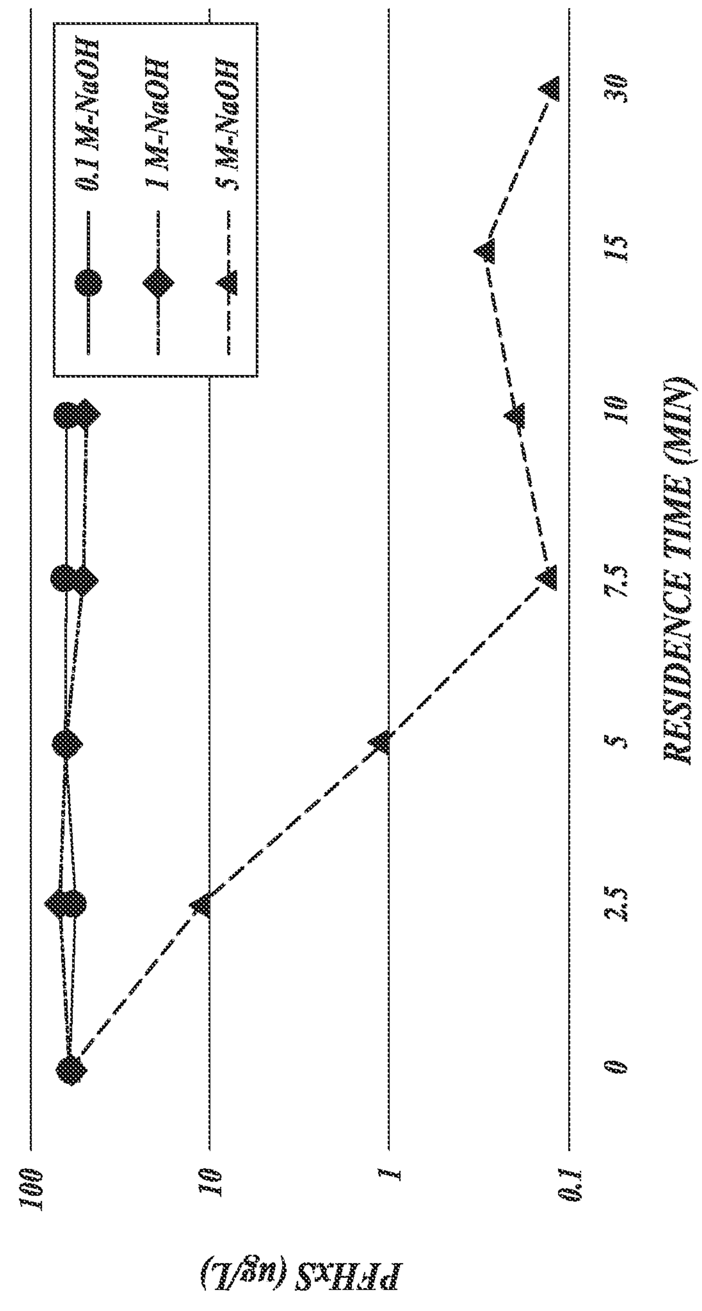
FIG. 8 is a graph of PFBS destruction for Example 2 residence times and NaOH loadings at 350° C. and 25 MPa in a continuous reactor operated with NaOH loadings of 0.1 to 5 M (mol/L).

FIG. 4 is a schematic flow diagram of a continuous hydrothermal alkaline reactor used in this Example. The reactor system includes a feedstock reservoir 402, a high pressure pump 404, a heated sand bath 406, container with room-temperature water 408, continuous length of 304 stainless steel tubing 410, thermocouple 412 immersed in sand bath, back-pressure regulator 414, heater controller 416, gas-liquid separator 418, and product collection bottle 420.

Over 1 gallon of sample from the FTP at Fairbanks International Airport was collected for feasibility testing in the continuous reactor of FIG. 4. The PFAS levels in the FTP water sample are shown in Table S1. Overall total PFAS levels are about 2.5 ppm to start, with PFOS being the main constituent. Additionally, the samples are co-contaminated with hydrocarbons, measured as diesel range organics (DRO) and residual range organics (RRO) via methods AK102 and AK103.

Samples were processed in the continuous reactor at 350° C., 25 MPa, residence times from 2.5 to 30 min, and NaOH loadings from 0.1 to 5 M. The reactor was flushed with deionized (DI) water between each experiment to minimize cross-contamination. One sample was collected during reactor flushing to quantify baseline PFAS levels in the effluent, and one sample was collected without heating or pressurizing the reactor, to quantify PFAS loss within the system due to adsorption. About 60 mL of sample was collected for each processing condition. Three samples run at 5 M-NaOH loading were collected for analysis of DRO and RRO levels after continuous hydrothermal alkaline hydrolysis.

After product collection, samples were buffered to a near-neutral pH through the addition of 36 to 38.5% HCl solution. Samples were then sent for analysis via commercial LC-MS/MS analysis of 28 PFAS analytes. Three samples were analyzed for DRO and RRO concentrations via methods AK102 and AK103. PFAS levels in the effluent were determined by correcting for dilution by HCl.

Results from the analysis of all treated and untreated samples are summarized in Tables S1 to S4. FIGS. 5 to 8 ($\log_{10}$ scale) show the reduction in total PFAS, PFOS, PFHxS, and PFBS (the main PFAS constituents) at all treatment conditions in the continuous reactor system.

As shown in FIGS. 5 to 8, PFAS destruction efficacy is closely tied to NaOH concentration, with significantly higher destruction and removal percentages achieved with 5 M-NaOH over 0.1 and 1 M-NaOH concentrations. Greater than 99% total PFAS removal is observed for all 5 M-NaOH tests with residence times longer than 5 min. The removal of PFOS, PFHxS, and PFBS is seen to roughly follow first-order reaction kinetics under 5 M-NaOH and 1 M-NaOH conditions. These observed rates are summarized in Table 1 and compared with previously reported PFOS destruction rates in "Rapid Destruction and Defluorination of Perfluorooctanesulfonate by Alkaline Hydrothermal Reaction, Wu et al., Envrion. Sci. Technol. Lett. 2019, 6, 10, Sep. 17, 2019 (hereafter "Wu et al.").

TABLE 1

Observed kinetic rates from this study in a continuous system, compared with reported rates in a batch system of Wu et al.

| | 5M-NaOH | | | 1M-NaOH | | |
|---|---|---|---|---|---|---|
| PFAS | PFOS | PFHxS | PFBS | PFOS | PFHxS | PFBS |
| $k_{obs}$ ($min^{-1}$) | 2.456 | 0.81 | 0.823 | 0.082 | 0.024 | 0.024 |
| $k_{obs}$ ($min^{-1}$) Wu et al. | 0.26 | — | — | 0.052 | — | — |

Roughly, the observed PFOS destruction kinetics in the continuous system is about 10 times faster than PFOS destruction in stainless steel batch reactors with 5 M-NaOH loading. However, this drops to an about 1.6× rate increase at 1 M-NaOH loading. This suggests that continuous reactors are much more sensitive to NaOH concentration.

Diesel range organics (DRO) and residual range organics (RRO) are long-chain hydrocarbon co-contaminants, present at sites where hydrocarbon fuels have been used. Both DRO and RRO are present in the FTP water, at average levels of 18.2 and 7.81 mg/L respectively.

As shown in Table S4, continuous hydrothermal alkaline hydrolysis treatment for 5, 15, and 30 minutes led to some reduction in both DRO and RRO. DRO was reduced by 50.8 to 78.0%, while RRO was reduced by 75.6 to 81.2% during tests. Previous work of Wu et al. in batch hydrothermal reactors has shown that some hydrocarbons are unstable under hydrothermal alkaline hydrolysis conditions, while some smaller hydrocarbons, such as methanol, are completely stable under hydrothermal alkaline hydrolysis conditions. Likely, some constituents in the DRO/RRO matrices are stable under continuous hydrothermal alkaline hydrolysis conditions, and there appears to be a limit in total treatment efficacy for these co-contaminants. Overall, the process managed to bring DRO and RRO levels closer to the discharge limits.

TABLE S1

PFAS analytes, DRO, and RO levels in Fairbanks, AK FTP water samples.

| Analyte | Fairbanks FTP Water* | FTP Water - Untreated through Reactor |
|---|---|---|
| PFBA | Not Analyzed | 25,578 |
| PFPA | Not Analyzed | 59,581 |
| PFHxA | 110,000 | 94,395 |
| PFHpA | 4,300 | 119,770 |
| **PFOA** | **6,750** | **414,120** |
| PFNA | 825 | 662 |
| PFDA | 285 | 695 |
| PFUnA | <180 | <500 |
| PFDoA | <180 | <500 |
| PFTrA | <180 | <500 |
| PFTrDA | <180 | <5,000 |
| PFBS | 56,000 | 58,566 |
| PFPS | Not Analyzed | 47,096 |
| PFHxS | 250,000 | 239,540 |
| PFHpS | Not Analyzed | 18,879 |
| **PFOS** | **1,300,000** | **1,045,450** |
| PFNS | Not Analyzed | <500 |
| PFDS | Not Analyzed | <500 |
| PFOSA | Not Analyzed | <1,000 |
| N—MeFOSAA | <460 | <1,000 |
| N—EtFOSAA | <460 | <1,000 |
| 4:2 FTS | Not Analyzed | 1,137 |
| 6:2 FTS | Not Analyzed | 279,125 |
| 8:2 FTS | Not Analyzed | 18,981 |
| ADONA | <180 | <1,000 |
| HFPO-DA | <370 | <1,000 |
| 9C1-PF3ONS | <180 | <1,000 |

TABLE S1-continued

| PFAS analytes, DRO, and RO levels in Fairbanks, AK FTP water samples. | | |
|---|---|---|
| Analyte | Fairbanks FTP Water* | FTP Water - Untreated through Reactor |
| 11C1-PF3OUds | <180 | <1,000 |
| **DRO (mg/L)** | **18.2** | **Not Analyzed** |
| **RRO (mg/L)** | **7.81** | **Not Analyzed** |

< Analyte not detected, listed as less than the method detection limit (MDL)

BOLD Concentration exceeds AK DEC groundwater cleanup levels of 400 ng/L ng/L nanograms per liter, equivalent to parts-per-trillion (ppt)

* Sampled and analyzed directly from FTP

TABLE S2

| PFAS analytes after treatment at 350° C., 25 MPa, 2.5 to 10 min residence time, and 0.1 M—NaOH | | | | | |
|---|---|---|---|---|---|
| Analyte | 2.5 min | 5 min | 7.5 min | 10 min | Flush Water |
| PFBA | <1,000 | <1,000 | <1,000 | <1,000 | <1,000 |
| PFPA | <500 | <500 | <500 | 670 | <500 |
| PFHxA | <500 | <500 | <500 | 938 | <500 |
| PFHpA | <500 | <500 | <500 | 1,151 | <500 |
| **PFOA** | <500 | <500 | <500 | **4,111** | <500 |
| PFNA | <500 | <500 | <500 | <500 | <500 |
| PFDA | <500 | <500 | <500 | <500 | <500 |
| PFUnA | <500 | <500 | <500 | <500 | <500 |
| PFDoA | <500 | <500 | <500 | <500 | <500 |
| PFTrA | <500 | <500 | <500 | <500 | <500 |
| PFTrDA | <500 | <500 | <500 | <500 | <500 |
| PFBS | 55,900 | 63,226 | 64,842 | 63,327 | 3,200 |
| PFPS | 45,200 | 52,015 | 52,722 | 51,005 | 2,790 |
| PFHxS | 230,000 | 272,700 | 268,660 | 271,690 | 14,300 |
| PFHpS | 17,700 | 19,392 | 20,301 | 19,897 | 1,030 |
| **PFOS** | **860,000** | **1,040,300** | **1,111,000** | **1,212,000** | **80,300** |
| PFNS | <500 | <500 | <500 | <500 | <500 |
| PFDS | <500 | <500 | <500 | <500 | <500 |
| PFOSA | <1,000 | <1,000 | <1,000 | <1,000 | <1,000 |
| N—MeFOSAA | <1,000 | <1,000 | <1,000 | <1,000 | <1,000 |
| N—EtFOSAA | <1,000 | <1,000 | <1,000 | <1,000 | <1,000 |
| 4:2 FTS | <1,000 | <1,000 | <1,000 | <1,000 | <1,000 |
| 6:2 FTS | <1,000 | <1,000 | <1,000 | <1,000 | <1,000 |
| 8:2 FTS | <1,000 | <1,000 | <1,000 | <1,000 | <1,000 |
| ADONA | <1,000 | <1,000 | <1,000 | <1,000 | <1,000 |
| HFPO-DA | <1,000 | <1,000 | <1,000 | <1,000 | <1,000 |

TABLE S2-continued

| PFAS analytes after treatment at 350° C., 25 MPa, 2.5 to 10 min residence time, and 0.1 M—NaOH | | | | | |
|---|---|---|---|---|---|
| Analyte | 2.5 min | 5 min | 7.5 min | 10 min | Flush Water |
| 9C1-PF3ONS | <1,000 | <1,000 | <1,000 | <1,000 | <1,000 |
| 11Cl-PF3OUds | <1,000 | <1,000 | <1,000 | <1,000 | <1,000 |

< Analyte not detected, listed as less than the method detection limit (MDL)

BOLD Concentration exceeds AK DEC groundwater cleanup levels of 400 ng/L ng/L nanograms per liter, equivalent to parts-per-trillion (ppt)

TABLE S3

| PFAS analytes after treatment at 350° C., 25 MPa, 2.5 to 10 min residence time, and 1 M—NaOH | | | | |
|---|---|---|---|---|
| Analyte | 2.5 min | 5 min | 7.5 min | 10 min |
| PFBA | <1,000 | <1,000 | <1,000 | <1,000 |
| PFPA | <500 | <500 | <500 | <500 |
| PFHxA | <500 | <500 | <500 | <500 |
| PFHpA | <500 | <500 | <500 | <500 |
| PFOA | <500 | <500 | <500 | <500 |
| PFNA | <500 | <500 | <500 | <500 |
| PFDA | <500 | <500 | <500 | <500 |
| PFUnA | <500 | <500 | <500 | <500 |
| PFDoA | <500 | <500 | <500 | <500 |
| PFTrA | <500 | <500 | <500 | <500 |
| PFTrDA | <500 | <500 | <500 | <500 |
| PFBS | 67,568 | 62,553 | 50,158 | 50,095 |
| PFPS | 52,808 | 48,361 | 39,217 | 39,772 |
| PFHxS | 248,187 | 230,342 | 197,167 | 198,860 |
| PFHpS | 17,493 | 16,484 | 12,567 | 12,279 |
| **PFOS** | **522,613** | **670,283** | **440,917** | **409,673** |
| PFNS | <500 | <500 | <500 | <500 |
| PFDS | <500 | <500 | <500 | <500 |
| PFOSA | <1,000 | <1,000 | <1,000 | <1,000 |
| N—MeFOSAA | <1,000 | <1,000 | <1,000 | <1,000 |
| N—EtFOSAA | <1,000 | <1,000 | <1,000 | <1,000 |
| 4:2 FTS | <1,000 | <1,000 | <1,000 | <1,000 |
| 6:2 FTS | <1,000 | <1,000 | <1,000 | <1,000 |
| 8:2 FTS | <1,000 | <1,000 | <1,000 | <1,000 |
| ADONA | <1,000 | <1,000 | <1,000 | <1,000 |
| HFPO-DA | <1,000 | <1,000 | <1,000 | <1,000 |
| 9C1-PF3ONS | <1,000 | <1,000 | <1,000 | <1,000 |
| 11CI-PF3OUds | <1,000 | <1,000 | <1,000 | <1,000 |

< Analyte not detected, listed as less than the method detection limit (MDL)

BOLD Concentration exceeds AK DEC groundwater cleanup levels of 400 ng/L ng/L nanograms per liter, equivalent to parts-per-trillion (ppt)

TABLE S4

| PFAS analytes after treatment at 350° C., 25 MPa, 2.5 to 30 min residence time, and 5M-NaOH | | | | | | |
|---|---|---|---|---|---|---|
| Analyte | 2.5 min | 5 min | 7.5 min | 10 min | 15 min | 30 min |
| PFBA | 12 | 8 | | 15 | 25 | |
| PFPA | 189 | 12 | 11 | 111 | 14 | 70 |
| PFHxA | 20 | 13 | 9 | 26 | 32 | 15 |
| PFHpA | 6 | 4 | 4 | 9 | 10 | 5 |
| PFOA | 8 | 10 | 11 | 11 | 20 | 11 |
| PFNA | <3 | <3 | <3 | <3 | <3 | <3 |
| PFDA | <3 | <3 | <3 | <3 | <3 | <3 |
| PFUnA | <3 | <3 | <3 | <3 | <3 | <3 |
| PFDoA | <3 | <3 | <3 | <3 | <3 | <3 |
| PFTrA | <3 | <3 | <3 | <3 | <3 | <3 |
| PFTrDA | <3 | <3 | <3 | <3 | <3 | <3 |
| PFBS | 11,011 | 1,115 | 132 | 192 | 288 | 124 |
| PFPS | 7,401 | 816 | 96 | 144 | 181 | 90 |
| PFHxS | 10,278 | 1,973 | 485 | 543 | 728 | 499 |
| PFHpS | 68 | 28 | 42 | 45 | 58 | 39 |
| **PFOS** | **2,255** | **1,287** | **2,309** | **1,951** | **3,708** | **1,416** |

TABLE S4-continued

| PFAS analytes after treatment at 350° C., 25 MPa, 2.5 to 30 min residence time, and 5M-NaOH | | | | | | |
|---|---|---|---|---|---|---|
| Analyte | 2.5 min | 5 min | 7.5 min | 10 min | 15 min | 30 min |
| PFNS | <3 | <3 | <3 | <3 | <3 | <3 |
| PFDS | <3 | <3 | <3 | <3 | <3 | <3 |
| PFOSA | <6 | <6 | <6 | <6 | <6 | <6 |
| N-MeFOSAA | <6 | <6 | <6 | <6 | <6 | <6 |
| N-EtFOSAA | <6 | <6 | <6 | <6 | <6 | <6 |
| 4:2 FTS | <6 | <6 | <6 | <6 | <6 | <6 |
| 6:2 FTS | 27 | 8 | 12 | 33 | 14 | 23 |
| 8:2 FTS | <6 | <6 | <6 | <6 | <6 | <6 |
| ADONA | <6 | <6 | <6 | <6 | <6 | <6 |
| HFPO-DA | <6 | <6 | <6 | <6 | <6 | <6 |
| 9C1-PF3ONS | <6 | <6 | <6 | <6 | <6 | <6 |
| 11Cl-PF3OUds | <6 | <6 | <6 | <6 | <6 | <6 |
| **DRO (mg/L)** | **Not Analyzed** | **4.00** | **Not Analyzed** | **Not Analyzed** | **8.95** | **7.31** |
| **RRO (mg/L)** | **Not Analyzed** | **1.47** | **Not Analyzed** | **Not Analyzed** | **1.91** | **1.86** |

<Analyte not detected, listed as less than the method detection limit (MDL)
BOLD Concentration exceeds AK DEC groundwater cleanup levels of 400 ng/L
ng/L nanograms per liter, equivalent to parts-per-trillion (ppt)

While illustrative embodiments have been illustrated and described, it will be appreciated that various changes can be made therein without departing from the spirit and scope of the disclosure.

The invention claimed is:

1. A method for destroying perfluoroalkyl and/or polyfluoroalkyl substances, comprising:
 introducing a liquid byproduct including a perfluoroalkyl and/or polyfluoroalkyl substance to a reactor;
 hydrolyzing in the reactor under alkaline conditions the perfluoroalkyl and/or polyfluoroalkyl substance in the liquid byproduct, wherein a temperature of the reactor is maintained between 300° C. and 400° C., wherein a pressure in the reactor is maintained between 0.1 MPa and 50 MPa, and wherein a pH in the reactor is maintained between 13 and 15.3 ($OH^-$ ion loading of between 0.1 M and 20 M); and
 producing a continuous stream of product from the reactor, wherein the liquid byproduct is selected from:
  a brine containing water, 20% wt. or less of a salt or base, and 1% wt. or less of the perfluoroalkyl and/or polyfluoroalkyl substance, or
  a solution containing 50 to 90 vol % of an alcohol, 10 to 50 vol % of water, 1 to 5 wt % of a salt or a base, and the perfluoroalkyl and/or polyfluoroalkyl substance, or
  a byproduct from ozone foam fractionate processing having 100 ug/L (ppb) to 10 mg/L (ppm) of the perfluoroalkyl and/or polyfluoroalkyl substance, or
  a byproduct from thermal treatment of soil or spent sorbents containing the perfluoroalkyl and/or polyfluoroalkyl substance, or
  a byproduct from wet scrubbers used to capture contaminants in an emission stream of incinerators, rotary kilns or other thermal destructive processes; or
  an aqueous film-forming foam having 0.3 to 6% by weight of the perfluoroalkyl and/or polyfluoroalkyl substance; or
  reverse osmosis reject brine having from 1 ug/L (ppb) to 10 mg/L (ppm) of the perfluoroalkyl and/or polyfluoroalkyl substance; or
  nanofiltration reject brine having from 1 ug/L (ppb) to 10 mg/L (ppm) of the perfluoroalkyl and/or polyfluoroalkyl substance.

2. The method of claim 1, comprising mixing the liquid byproduct with an alkaline amendment before the reactor, wherein the alkaline amendment is NaOH, KOH, LiOH, $NH_4OH$, $Ca(OH)_2$ or a combination thereof.

3. The method of claim 1, comprising introducing the liquid byproduct and an aqueous alkaline solution separately through a first inlet and a second inlet to the reactor.

4. The method of claim 1, further comprising cooling an effluent leaving the reactor to produce a liquid effluent.

5. The method of claim 4, further comprising cooling the effluent with the liquid byproduct before introducing to the reactor.

6. The method of claim 4, further comprising introducing a neutralizing agent to the liquid effluent to adjust pH of the liquid effluent.

7. The method of claim 6, wherein the neutralizing agent includes HCl or $H_2SO_4$.

8. The method of claim 4, comprising adding a calcium salt to the liquid effluent to produce precipitates, wherein the precipitates include $CaF_2$ or $CaSO_4$ or both.

9. The method of claim 4, comprising measuring one or more parameters of the liquid effluent including a concentration of the contaminant in the liquid effluent, a concentration of destruction byproducts, or a pH of the liquid effluent, or a combination thereof.

10. The method of claim 9, wherein the concentration of destruction byproducts is an $F^-$ ion concentration.

11. The method of claim 1, wherein the pressure in the reactor is between a pressure sufficient to maintain a liquid reaction environment and 50 MPa.

12. A method for destroying a contaminant in a byproduct from an adsorbent media regeneration or reactivation process, comprising:
 introducing a byproduct from an adsorbent media regeneration or reactivation process to a reactor; and
 hydrolyzing in the reactor under alkaline conditions a contaminant in the byproduct, wherein a temperature of the reactor is maintained between 300° C. and 400° C., wherein a pressure in the reactor is maintained between 0.1 MPa and 50 MPa, and wherein a pH in the reactor is maintained between 13 and 15.3 ($OH^-$ ion loading of between 0.1 M and 20 M) wherein the byproduct is a liquid selected from:
  a brine containing water, 20% wt. or less of a salt or base, and 1% wt. or less of the contaminant, or
  a solution containing 50 to 90 vol % of an alcohol, 10 to 50 vol % of water, 1 to 5 wt % of a salt or a base, and the contaminant.

13. The method of claim 12, wherein the contaminant is selected from a perfluoroalkyl compound, a polyfluoroalkyl compound, perfluorooctanesulfonate, perfluorooctanoic acid, 1'4-dioxane, a polycholorinated biphenyl, a hydrocarbon, and a volatile organic carbon, or a combination thereof.

14. The method of claim 12, wherein an absorbent media in the absorbent media regeneration or reactivation process is granular activated carbon or an ion exchange resin.

* * * * *